Aug. 14, 1945.     C. L. EKSERGIAN     2,382,550
RAILWAY BRAKE
Filed Sept. 21, 1943
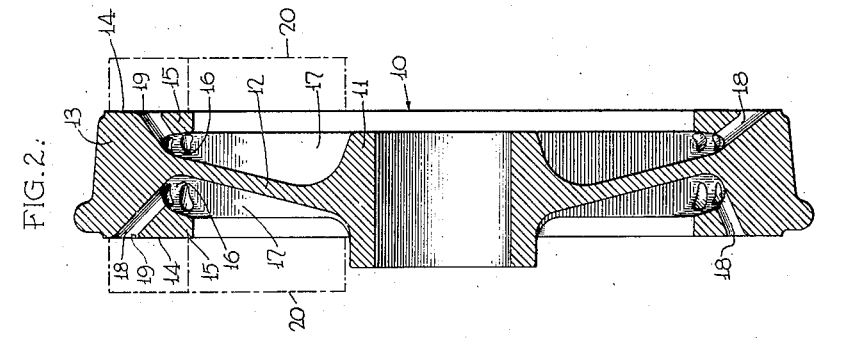
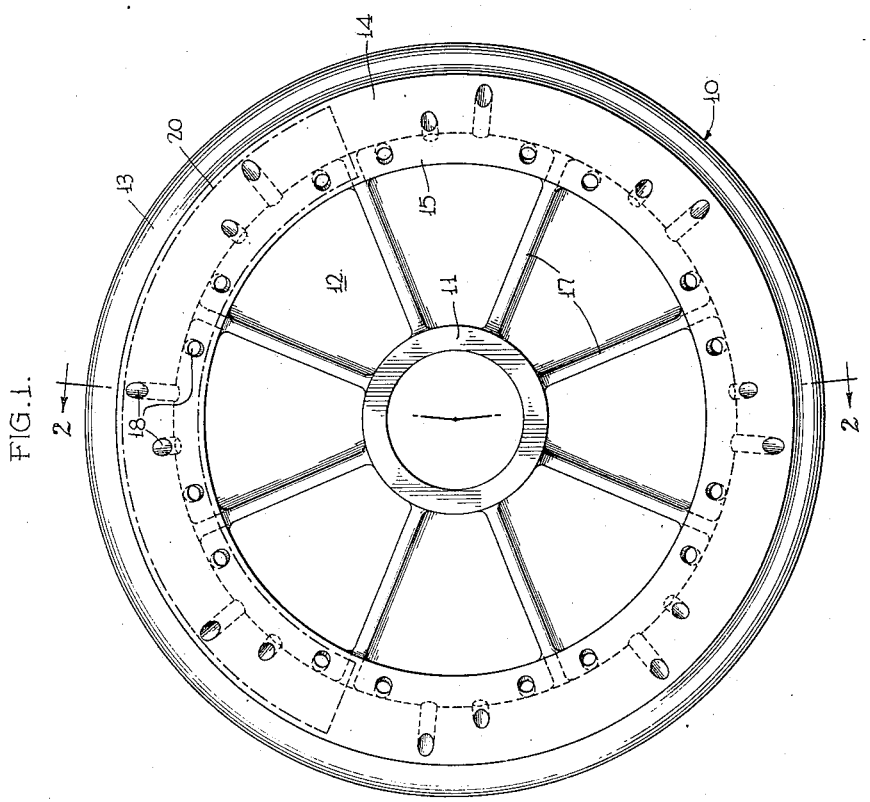
*INVENTOR*
Carolus L. Eksergian,
BY
*ATTORNEY*

Patented Aug. 14, 1945

2,382,550

UNITED STATES PATENT OFFICE 2,382,550

RAILWAY BRAKE

Carolus L. Eksergian, Detroit, Mich., assignor to Budd Wheel Company, Philadelphia, Pa., a corporation of Pennsylvania Application September 21, 1943, Serial No. 503,203

4 Claims. (Cl. 188—218)

The invention relates to rail car wheels and particularly to such wheels adapted for braking on the radial faces of the rims thereof.

Rail car wheels, as heretofore constructed, are not adapted for the application of radial brakes on the lateral faces of the rim since the rim faces are too narrow radially to provide efficient braking. If sufficient braking pressure would be applied to these narrow faced rims, the heat generated by the friction would be so great as to be liable to break the rim due to the internal stresses. On the other hand, the rim of the wheel is the logical place to apply the brakes because it is far removed from the axis of rotation and greater braking torque is possible under less applied braking pressure. It has heretofore been proposed to brake on the radial faces of the rim, but such proposals have been open to the disadvantages pointed out above.

It is the object of the invention to provide a rail car wheel in which braking on the radial faces of the rim becomes practical, and this object is in large part achieved by making the braking faces on the rim relatively wide radially, as compared with the usual such faces, by extending the rim radially inwardly a substantial distance. This widened face permits larger braking shoes to be effectively used with less braking pressure per unit of area and consequently less generation of heat in the braking operation. In addition, this inward extension of the rim enables the convenient formation of annular radially inwardly facing pockets between the rim and the body of the wheel, which pockets may be connected by widened passages with the outer braking faces on the rim and thus provide for adequate cooling of said faces. The cooling is enhanced and the wheel strengthened by cooling fins extending generally radially of the wheel body and into the annular pockets tying together the inward extension of the rim with the wheel body. In the rotation of the wheel, these fins act as centrifugal blowers, blowing air into the pockets from which it passes through the passages to the braking faces, thereby adequately cooling the same.

Other and further objects and advantages and the manner in which they are attained will become apparent from the following description when read in connection with the accompanying drawing in which, Fig. 1 is a side elevation of a wheel embodying the invention, a segmental brake shoe being shown in operation position in dot-and-dash lines; and Fig. 2 is a section taken substantially along the line 2—2 of Fig. 1, showing in dot-and-dash lines brake shoes in position at the opposite sides of the wheel.

The wheel of the invention is designated generally by numeral 10 and may be of any cast or wrought metal usual in the railcar wheel art. It is shown as comprising a hub portion 11, a body portion 12, and a rim portion 13, all integrally joined together. It is quite evident that the rim portion 13 has radial braking faces on opposite sides thereof, designated generally 14, which are very substantially wider radially than such faces on the rim of an ordinary car wheel. These wide radial braking faces are formed by radially inward extensions 15 from the main body of the rim, these extensions being spaced from the periphery of the wheel body 12 where it joins the rim and form therewith on opposite sides thereof annular radially inwardly facing pockets 16. These pockets are divided into segments by spaced radially extending fins 17 projecting from the opposite sides of the body of the wheel and beginning, in radial extent, in the vicinity of the hub and terminating at their outer ends in the respective annular pockets 15, where they serve to strengthen not only the wheel body but to interbrace the wheel body and rim extensions 15.

To provide adequate cooling, the annular pockets 16 are each connected with the adjacent braking faces by a plurality of inclined generally radially outwardly extending passages 18, these passages terminating at their outer ends in the adjacent braking face 14 at various radial distances from the inner periphery of said face so as to provide cooling over the entire face. As shown particularly in Fig. 2, the outer ends of these passages preferably merge through rounded margins as 19 into the adjacent braking face. This is to provide a surface over which the brake shoe 20, indicated as of segmental shape in the dot-and-dash lines of Fig. 1, may slide over the openings without injury to the material of the shoe.

It will be seen that the wide braking faces formed by the inward extensions of the rim provide adequate braking when the shoes are pressed into braking engagement by any suitable means (not shown) but such pressure need not be excessively high, resulting in decreased wear and less generation of heat, this being particularly true where, as is here clearly shown in the drawing, the width of the braking face is made at least substantially as great as the width of the tread of the rim portion, Furthermore, the wheel is provided with efficient cooling means since the rotation of the wheel causes a constant stream of air to be thrown out centrifugally in the passages between the fins 17, into the annular pockets 16, and from them through the inclined passages 18 to the braking surfaces 14 at numerous radially spaced points in the braking surface. Thus the air is constantly delivered at high speed at the points where the heat is being generated by the braking.

The cooling fins 17 further have a double purpose in that they add materially to the strength of the wheel body and strongly tie the wheel body to the radial rim extensions 15 so as to avoid strain or distortion of these extensions and insuring a flat braking surface with which the shoe engages throughout with a uniform braking pressure per unit of area.

It will be seen from the foregoing description that the wheel shown and described provides an extremely efficient combined wheel and brake member and is devoid of the drawbacks generally associated with braking directly on the wheel.

While a specific construction has been shown and described, it will be understood that changes in detail will readily occur to those skilled in the art and such changes are intended to be covered by the appended claims.

What is claimed is:

1. A railcar wheel having a body portion and a rim portion, the rim portion having a radially inward extension forming with the body portion an annular radially inwardly facing pocket, the rim and its extension forming a widened braking face, and passages for the circulation of cooling air between said pocket and the braking face.

2. A railcar wheel having a body portion provided with generally radially extending fins and a rim portion having a radially inward extension forming with the body an annular radially inwardly facing pocket divided into segments by said fins, the rim and its extension forming a widened radial braking face, and passages for cooling air connecting the segments of said annular pocket with the braking face.

3. A railcar wheel according to claim 1 in which the passages have their outer ends terminating at various radial points on said braking face.

4. A rail car wheel including a wheel body portion and a rim portion on the periphery of said body portion and extending axially on opposite sides of the periphery of said body portion, said rim portion having radially inward extensions from its main body at its axially opposite ends forming with said main body radially extending braking faces of a width at least substantially as great as the width of the tread of the rim portion, and passageways in the rim portion on each side of said wheel body portion having air entrance openings radially inwardly of said braking faces and extending generally radially outwardly to air exit openings disposed radially inwardly of the rim periphery.

CAROLUS L. EKSERGIAN.